(12) United States Patent
Bear et al.

(10) Patent No.: US 7,194,611 B2
(45) Date of Patent: Mar. 20, 2007

(54) METHOD AND SYSTEM FOR NAVIGATION USING MEDIA TRANSPORT CONTROLS

(75) Inventors: Eric Gould Bear, Bellevue, WA (US); Chad Magendanz, Issaquah, WA (US); Aditha May Adams, Seattle, WA (US); Carl Ledbetter, Mercer Island, WA (US); Steve Kaneko, Medina, WA (US); Dale C. Crosier, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 10/677,106

(22) Filed: Sep. 30, 2003

(65) Prior Publication Data

US 2005/0071437 A1 Mar. 31, 2005

(51) Int. Cl.
*G06F 3/23* (2006.01)

(52) U.S. Cl. .................. 713/1; 713/2; 341/22; 345/168; 345/169; 400/472; 400/786

(58) Field of Classification Search .................... 713/1, 713/2; 400/472, 486; 341/22; 345/168–169
See application file for complete search history.

(56) References Cited

U.S. PATENT DOCUMENTS

| | | | |
|---|---|---|---|
| 4,860,342 A | | 8/1989 | Danner |
| 5,568,540 A * | | 10/1996 | Greco et al. ............. 379/88.25 |
| 6,052,442 A * | | 4/2000 | Cooper et al. ........... 379/88.19 |
| 6,240,168 B1 | | 5/2001 | Stanford et al. |
| 6,483,905 B1 * | | 11/2002 | Kikinis .................... 379/93.24 |
| 6,518,957 B1 | | 2/2003 | Lehtinen et al. |
| 6,603,855 B1 | | 8/2003 | Cannon et al. |
| 6,731,316 B2 * | | 5/2004 | Herigstad et al. ........... 715/864 |
| 6,902,332 B2 * | | 6/2005 | McLoone ................... 400/472 |
| 6,973,167 B2 * | | 12/2005 | Kikinis ...................... 379/67.1 |
| 2004/0141012 A1 * | | 7/2004 | Tootill ......................... 345/827 |
| 2004/0240167 A1 * | | 12/2004 | Ledbetter et al. ........... 361/683 |

FOREIGN PATENT DOCUMENTS

| | | |
|---|---|---|
| EP | 0772327 A2 | 5/1997 |
| EP | 0777394 A1 | 6/1997 |
| EP | 0838934 A1 | 4/1998 |
| EP | 0772327 A3 | 2/1999 |
| GB | 000816990 A2 * | 7/1998 |
| WO | WO9602049 A1 | 1/1996 |

* cited by examiner

*Primary Examiner*—A. Elamin
(74) *Attorney, Agent, or Firm*—Workman Nydegger

(57) ABSTRACT

A system and method for improved navigation and access of computer media content using media transport controls is provided. These transport controls may be placed in various locations such as on the computer housing, on a keyboard, on a monitor or a remote control. With these controls, a user may easily play multimedia content and navigate to individual tracks or segments of an audio and/or video stream. The transport controls include a play/pause button, a stop button, a previous button, and a next button. A user may intuitively activate and interact with media content in a variety of applications using these transport controls. For example, users may play recordings such as voice mail and review their recorded replies using the transport controls. Users may similarly play and/or review multimedia annotations made to any application files, including traditional computer files such as spreadsheets, documents and presentations.

35 Claims, 9 Drawing Sheets

METHOD AND SYSTEM FOR NAVIGATION USING MEDIA TRANSPORT CONTROLS

CROSS-REFERENCE TO RELATED APPLICATIONS

The present invention is related to the following copending U.S. patent applications filed May 5, 2003, assigned to the assignee of the present invention, and hereby incorporated by reference in their entireties:

U.S. patent application Ser. No. 0/429,932 entitled "Method and System for Auxiliary Display of Information for a Computing Device,";

U.S. patent application Ser. No. 0/429,905 entitled "Real-Time Communications Architecture and Methods for use with a Personal Computer System,"

U.S. patent application Ser. No. 0/429,904 entitled "Record Button on a Computer System,"

U.S. patent application Ser. No. 0/429,930 entitled "Method and System for Auxiliary Processing Of Information for a Computing Device,";

U.S. patent application Ser. No. 0/429,903 entitled "Computer System with Do Not Disturb System and Method,";

U.S. patent application Ser. No. 0/429,943 entitled "Computer Camera System and Method for Reducing Parallax,";

U.S. patent application Ser. No. 0/429,933 entitled "Control and Communications Panel for a Computer System,"

U.S. patent application Ser. No. 0/429,931 entitled "Notification Lights, Locations and Rules for a Computer System,".

FIELD OF THE INVENTION

The invention relates generally to computer systems, and more particularly to an improved method and system for navigating and accessing content of computer applications using media transport controls.

BACKGROUND OF THE INVENTION

The role of contemporary computers continues to evolve as a tool used for communications and media applications. Personal computers offer many new and exciting media applications for personal entertainment such as live television, personal video recording, playing or recording digital music, displaying or creating digital photographs, playing movies recorded on a DVD, and so forth.

With the introduction of Voice-over-IP (VoIP) and other IP telephony applications, computers may also be used for handling phone calls and voice mail in addition to handling media applications and customary communication applications such as email, instant messaging, and fax communications. A personal computer with integrated telephony can enhance voice and video communication in ways that empower the user while increasing user productivity and enjoyment. For example, a personal computer may be designed that is capable of accepting incoming calls of various kinds such as analog Public Switched Telephone Network (PSTN), private branch exchange (PBX), cellular telephony or VoIP. There is the potential for such a personal computer to be connected to telephone equipment for PSTN, cellular telephony or PBX, and provide an enhanced user interface such as for handling voice mail.

Media controls may be provided by each application through its software user interface for interacting with content supported by that application. Such media controls are not available to other applications for users to control different multimedia content. What is needed is a method and system for a user to interact with these various communications and media applications. Although some existing interfaces could be used for interacting with and controlling these various applications, what is needed is a user interface that may work across these various modalities.

SUMMARY OF THE INVENTION

Briefly, the present invention provides an improved system and method for navigating and accessing content of computer applications using media transport controls. These transport controls may be placed in various locations such as on the computer housing, on a keyboard, on a monitor or a remote control. With these controls, a user may easily play multimedia content and navigate to individual tracks or segments of an audio and/or video stream. The transport controls include a play/pause button, a stop button, a previous button, and a next button. There may also be an optional record button in close proximity to the transport controls. Because the state of an individual transport control button may not be readily apparent to a user, an indicator light such as an LED may be located adjacent to or integrated into each transport control button.

These transport controls allow a user to intuitively activate and interact with media content in a variety of applications. For example, using the transport controls, users may play traditional recordings, such as CD-ROMs and DVD-ROMs, as well as control recordings such as voice mail such as to play the recordings and review their recorded replies. For example, a user may browse a list of voice mails saved on a hard disk or the like using a "Next" button to scroll down the list of voice mail messages, or scroll back up the list using a "Previous" button. While listening to a specific voice mail message, a user may also rewind or fast forward through the message using the previous and next buttons. Users may use such controls to similarly play and/or review multimedia annotations made to any application files, including traditional computer files such as spreadsheets, documents and presentations.

In general, the system and method of the present invention provides a fairly comprehensive as well as flexible and extensible mechanism to handle virtually any media. Additional transport controls may be easily added as needed.

Other advantages will become apparent from the following detailed description when taken in conjunction with the drawings, in which:

DETAILED DESCRIPTION

Exemplary Operating Environment

Figure 1:
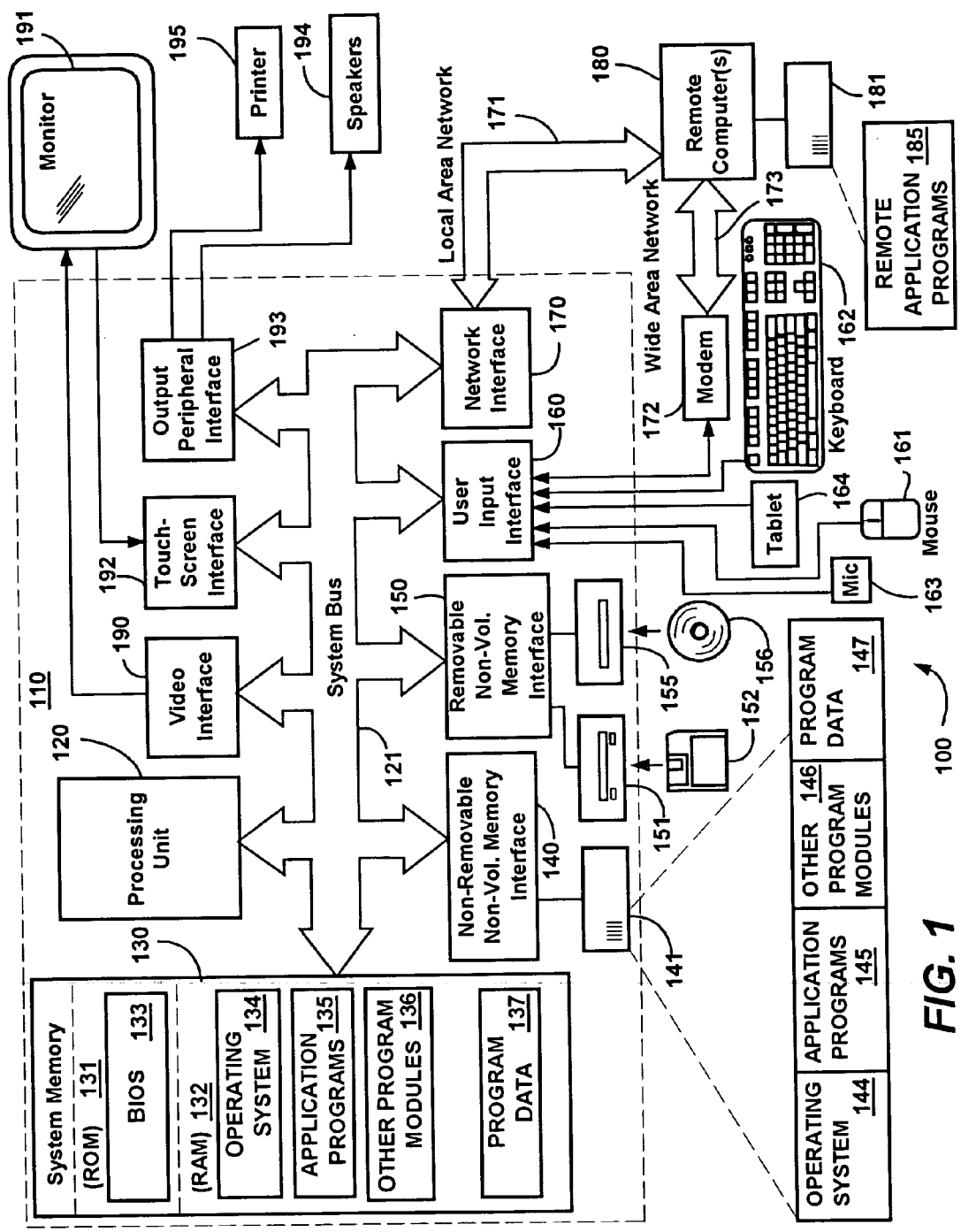
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Navigation of Applications Using Media Transport Controls

The present invention is generally directed towards an improved method and system for navigating and accessing content of computer applications using media transport controls. As will be seen, the transport controls may be located in a variety of places such as on the computer 110 housing, on a keyboard, on a monitor, and so forth. Some or all of the transport controls may be located in multiple places on the same computer system. These transport controls allow users to intuitively activate and interact with multimedia content in a variety of applications such as handling voice mail and making annotations to documents or spreadsheets. As will be understood, the various state diagrams, devices and scenarios described herein are only examples, and there are many other scenarios to which the present invention will apply.

Figure 2:
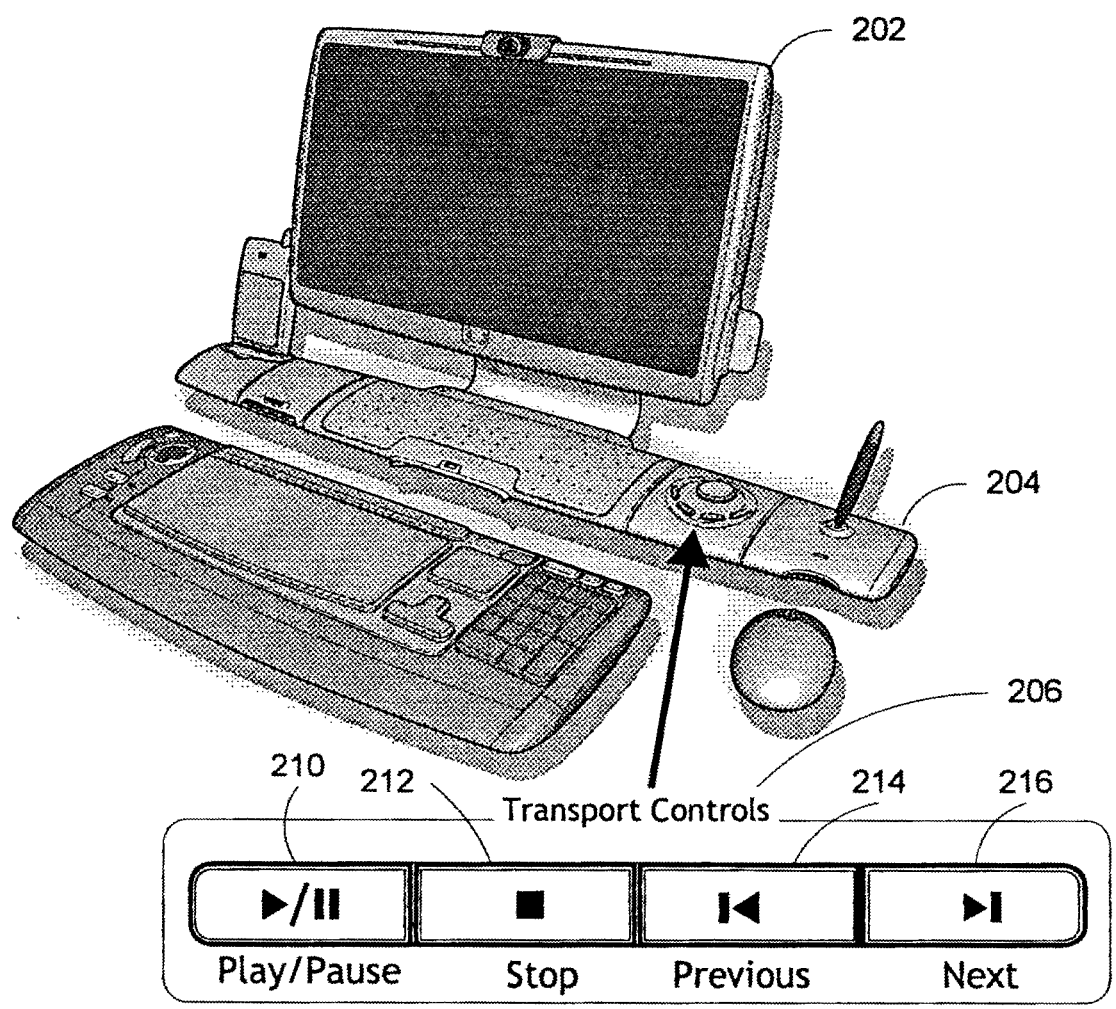
FIG. 2 is a general representation of an example control panel positioned beneath a computer monitor, having transport controls incorporated into the control panel in accordance with an aspect of the present invention.

Turning to FIG. 2 of the drawings, there is shown a general representation of a control panel 204 positioned beneath a computer monitor 202 with transport controls 206 (shown magnified) incorporated into the control panel 204. In this configuration, the control panel 204 is coupled to the computer 110 through a serial interface or by other interfaces, such as a parallel port, game port, infrared or wireless connection, universal serial bus (USB) or other peripheral device connection. The transport controls 206 include a Play/Pause button 210, a Stop button 212, a Previous button 214 and a Next button 216. In one embodiment, there may also be an optional Record button (not shown) in close proximity to the transport controls 206. Other controls are also feasible, e.g., jump to end, jump to beginning, skip, and so forth.

In general, the transport controls 206 are used to initiate multimedia playback and to navigate to individual tracks or segments of an audio/video stream. For example, pressing the Play/Pause button 210 initiates playback for the default or selected media item. Pressing the Play/Pause button 210 during playback pauses playback. Pressing the Play/Pause button 210 while paused resumes playback. Pressing the Stop button 212 during playback stops playback and may reset the playback index to the beginning of the track or stream segment. Other examples include quickly pressing and releasing the Previous button 214 skips playback to the previous track or stream. Quickly pressing and releasing the Next button 216 skips playback to the next track or stream segment. Pressing and holding the Previous button 214 rewinds through the stream. Pressing and holding the Next button 216 fast forwards through the stream.

Figure 3:
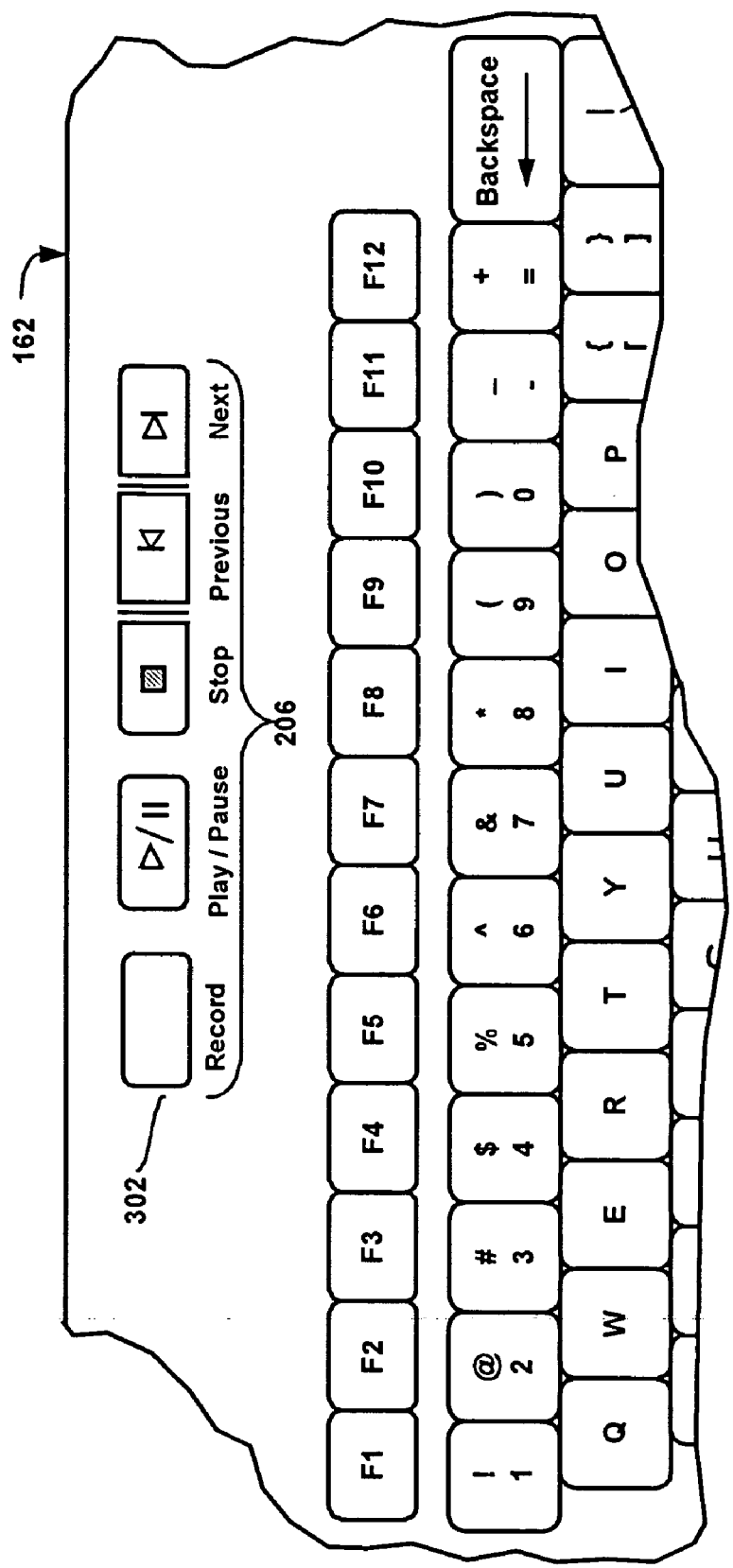
FIG. 3 is a general representation of a partial keyboard with transport controls incorporated into the keyboard, in accordance with an aspect of the present invention.

It will be appreciate by those skilled in the art that the general functionality described above, as well as the type of transport controls 206 illustrated in FIG. 2 as being incorporated into the control panel 204, is an exemplary configuration and that the present invention may be implemented using other configurations (and functionality for such controls), such as the configuration illustrated in FIG. 3 with the transport controls located on the keyboard.

FIG. 3 presents a general representation of a partial keyboard with transport controls 206 incorporated into the keyboard 216. In this embodiment, an optional Record button 302 is shown in close proximity to the transport controls 206. Pressing the Record button 302 initiates recording of the default or selected media item. Recording terminates whenever the Record button 302 is pressed while recording. Note that an indicator light such as an LED may be optionally associated with or incorporated into one or more of the transport control buttons. For example, there may be an indicator light associated with the Play/Pause button 210 that illuminates as a steady green light during playback. If the Play/Pause button 210 is pressed during playback, the playback pauses and the indicator light associated with this button may change, such as to turn from steady green to a steady amber. Pressing the Play/Pause button 210 while paused resumes playback and the indicator light correspondingly turns from amber back to a steady green light again, and so forth.

The transport control buttons 206 as well as the indicators may be located anywhere on the computer or the computer peripherals. Generally, the LEDs will be in an intuitive location, such as proximate the transport controls, or optimized for viewing such as above or below the monitor.

Figure 4:
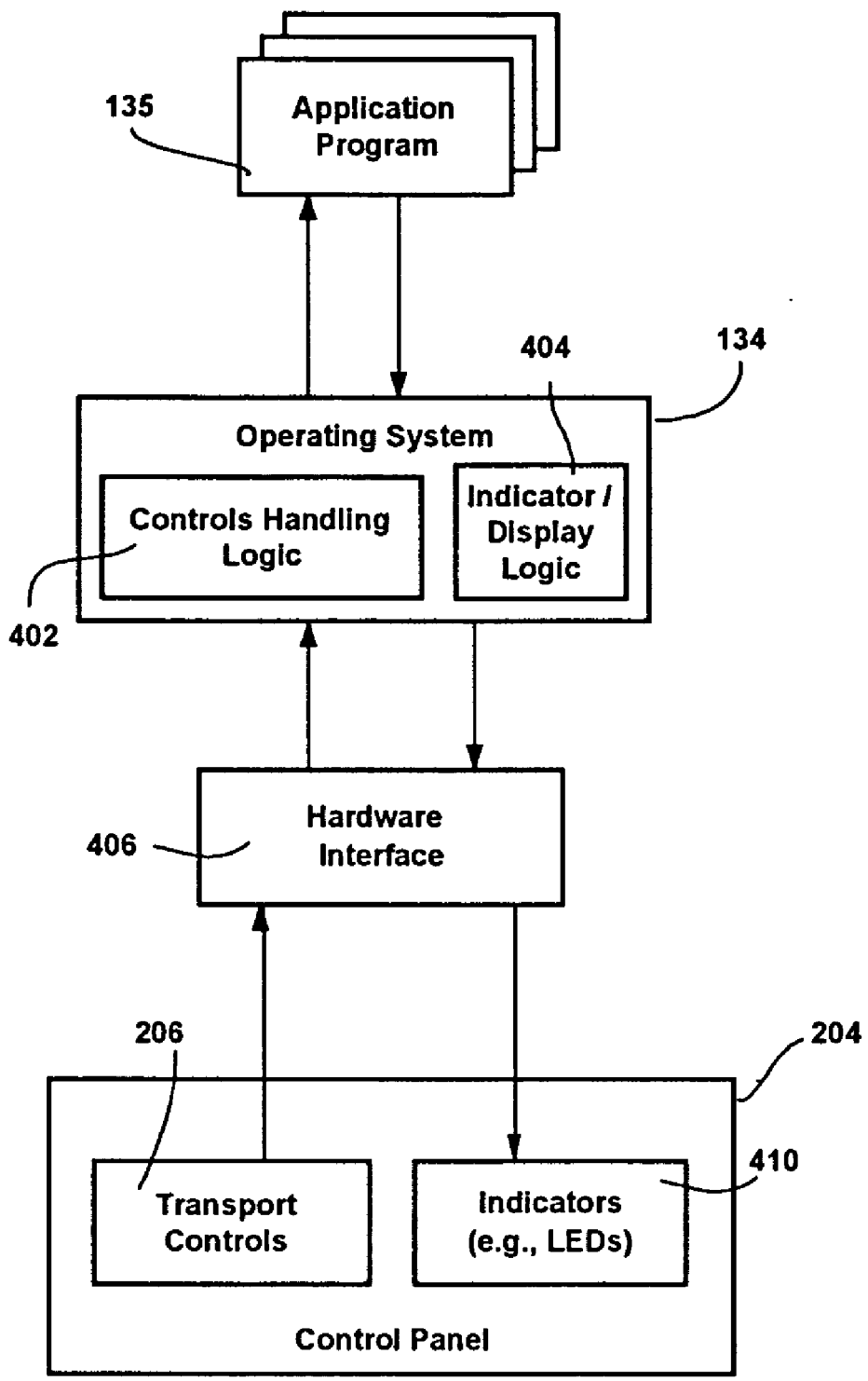
FIG. 4 is a block diagram generally representing components in an exemplary embodiment of the transport controls, in accordance with an aspect of the present invention.

FIG. 4 is a block diagram generally representing the components in an exemplary embodiment of the transport controls. Those skilled in the art will appreciate that the functionality implemented within the blocks illustrated in the diagram may be implemented as separate components or the functionality of several or all of the blocks may be implemented within a single component. For example, a separate library may be implemented that contains the functionality of the control handling logic and the functionality of the display logic. In such an implementation, executables linked to the library may send control events directly to the control interface when they are executing on the computer system.

FIG. 4 shows how the transport controls 206 on the control panel 204 may be used to perform computer and communications-related tasks. In general, state changes or the like in the controls are provided to the control handling program (e.g., the operating system 134, or an application program 135), along with data that identifies the control. Via controls handling logic 402, the control handling program then acts in the current context corresponding to the control. This may include generating one or more hardware or software events or commands, such as initiating multimedia playback, navigating to individual tracks or segments of an audio/video stream, pausing playback of an audio/video stream, and so forth.

The control handling program also controls any indicators 410 that may be present to convey information to the user, such as described above, via indicator display logic 404 general, the control handling logic 402 and the indicator/display logic 404 communicate with the hardware interface 406 to receive input commands from the transport controls 206 and send output to the indicators 410 for display. Note that the indicators need not be LEDs, but include any type of mechanism that outputs information that is capable of being sensed by a user, including visual, audible and/or tactile output. Each of the indicators may be related to one of the controls, and thus each indicator may be incorporated into or positioned proximate its corresponding control. Where the indicators are LEDs or the like, colors and illumination patterns (frequencies, duty cycles, number of pulses, and so forth) may be varied to convey different information to users regarding each control.

Further, although an operating system 134 (or some application program 135) is shown in FIG. 4 as handling the controls, it should be noted that the computer system need not be fully operational for the transport controls of the control panel and/or the indicators to work in accordance with the present invention. Indeed, some of the controls may still work when the computer is powered down, at least to a default extent or to an extent configured by a user. For example, the user may want the transport controls to work as a conventional appliance when the computer system is powered down, so that the user may operate any applications that may allow media playback when the computer system is otherwise powered down. Any tasks that do not require a running operating system or application program similarly may remain operational and use the transport controls when the operating system or application program is not available or in standby mode.

To handle the controls and communications in such a powered-down mode, the control handling logic may be loaded into executable non-volatile memory, operated with a secondary processor, and so forth, so that communication works as long as some power is available, even though the disk, main processor, main display, network card and/or other parts of the system are powered down.

Figure 5:
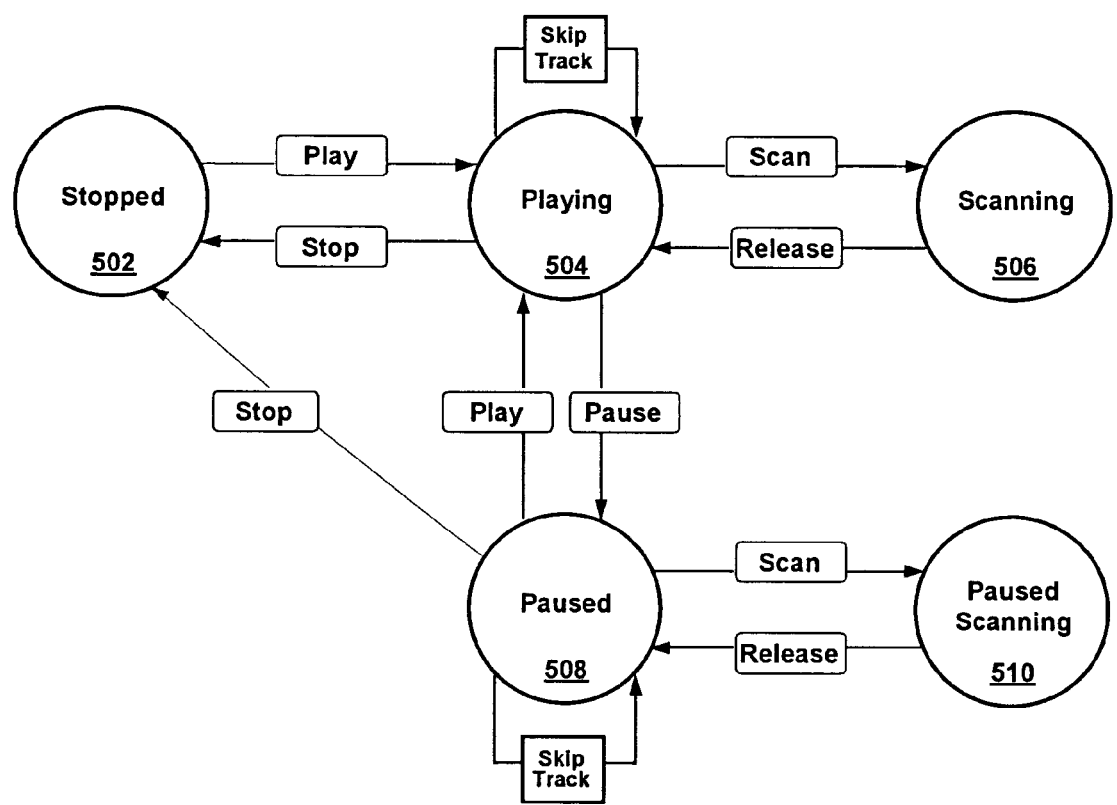
FIG. 5 is a state diagram generally illustrating the states of operation of the control handling logic for the transport controls, in accordance with an aspect of the present invention.

FIG. 5 presents a state diagram generally illustrating the states of operation of the control handling logic 402 for the transport controls 206. More particularly, the state diagram illustrates five states of operation applicable for the transport controls 206 and the actions associated with the transition between the states. FIG. 5 will be described using a voicemail application as an example. As will be understood, the operations using the transport controls for the voicemail application is one example of many applications that may use the transport controls for multimedia playback and to navigate to individual tracks or segments of a multimedia stream.

Before the first voicemail is selected, the system is in a Stopped state 502 without any voicemail played. Whenever a play event is received for a selected voicemail, then the system transitions to the Playing 504 state and the voicemail is played. A play event occurs whenever the user presses the Play/Pause 210 button while in the Stopped state 502. It will be appreciated by those skilled in the art that there are other ways of generating a play event, such as selecting a play menu item using a graphical user interface.

A user may wish to replay a portion of the voicemail played or skip over an unplayed portion of the voicemail. If a skip track event occurs while in Playing 504 state, the system skips a track (or some section of the voicemail such as ten seconds worth) and remains in the Playing 504 state. A skip event occurs whenever the user quickly presses and releases the Previous 214 button. This skips playback to the previous track or stream. A skip event also occurs whenever the user quickly presses and releases the Next 216 button. This skips playback to the next track or stream segment. A user may also want to completely rewind to the beginning of the played portion of the voicemail or fast forward to the end of the voicemail. If a scan event is received while in Playing 504 state, then the system transitions to the Scanning 506 state. A scan event occurs whenever the user presses and holds the Previous 214 button. This rewinds through the stream until the Previous 214 button is released. A scan event also occurs whenever the user presses and holds the Next 216 button. This fast forwards through the stream until the Next 214 button is released. There are other ways of generating a skip track or scan event, such as selecting from a menu item using a graphical user interface. When the user releases the Previous 214 button or the Next 216 button while in the Scanning 506 state, a release event occurs and the system transitions back to the Playing 504 state.

A user may wish to pause playback of the voicemail. If a pause event occurs while the system is in the Playing 504 state, then the system transitions to the Paused 508 state. A pause event occurs whenever the user presses the Play/Pause button 210 during playback. Alternatively, a pause event may be generated in other ways such as selecting from a menu item using a graphical user interface. While playback is paused, a user may also choose to replay a portion of the voicemail played or skip over an unplayed portion of the voicemail. If a skip track event occurs while in Paused 508 state, the system skips a track and remains in the Paused 508 state. A skip event occurs whenever the user quickly presses and releases the Previous 214 button. This skips from the paused track to the previous track or stream. A skip event also occurs whenever the user quickly presses and releases the Next 216 button. This skips from the paused track to the next track or stream segment.

Likewise, a user may also want to completely rewind to the beginning of the played portion of the voicemail or fast forward to the end of the voicemail while playback is paused. If a scan event is received while in Paused 508 state, then the system transitions to the Paused Scanning 510 state. As previously discussed, a scan event occurs whenever the user presses and holds the Previous 214 button. This rewinds through the stream until the Previous 214 button is released. A scan event also occurs whenever the user presses and holds the Next 216 button. This fast forwards through the stream until the Next 216 button is released. There are other ways of generating a skip track or scan event, such as selecting from a menu item using a graphical user interface. When the user releases the Previous 214 button or the Next 216 button while in the Paused Scanning 510 state, a release event occurs and the system transitions back to the Paused 508 state. Pressing the Play/Pause 210 button while paused transitions the system back to the Playing 504 state and playback initiates for the paused track.

A user may wish to end playback of the voicemail while playing or while playback is paused. If a stop event occurs while the system is in the Paused 508 state or the Playing 504 state, the system transitions to the Stopped 502 state. A stop event occurs whenever the user presses the Stop 212 button. A stop event may also be generated by other ways such as selecting from a menu item using a graphical user interface. A stop event may also occur whenever the entire voicemail has been played or a skip or scan event fast forwards to the end of the recorded voicemail. While in the Stopped 502 state, the system ceases playing any voicemail.

Figure 6:
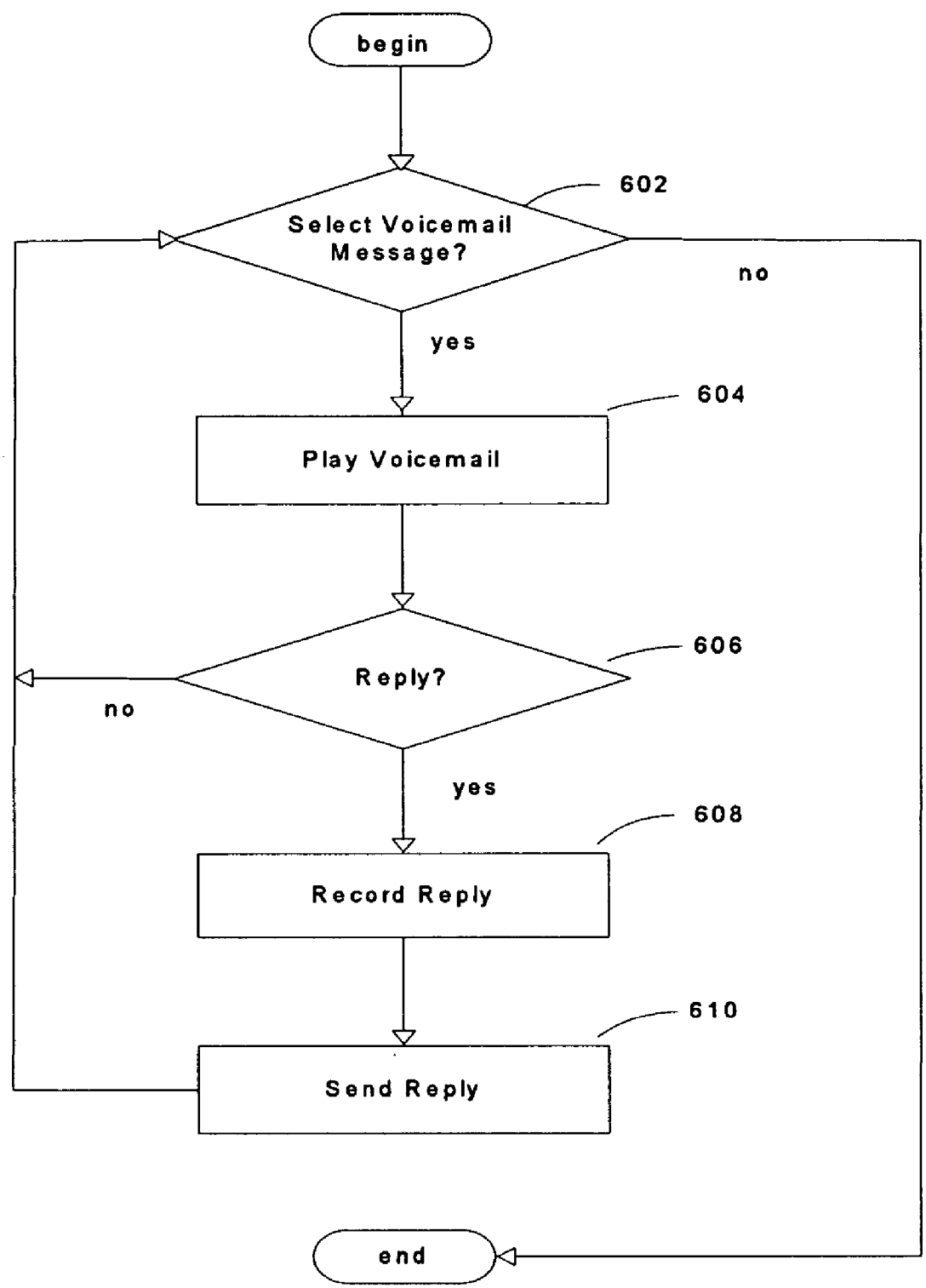
FIG. 6 is a flowchart generally representing example steps taken by a voicemail application using transport controls to access and respond to voicemail messages, in accordance with an aspect of the present invention.

FIG. 6 presents a flowchart illustrating a voicemail application using the transport controls 206 to access and respond to voicemail messages. The voicemail application may be launched when the system is started. Those skilled in the art will appreciate that there are other ways of launching the application, such as a user may launch it by pressing a voicemail button or selecting the application from a menu of a graphical user interface, or the computer system may launch the application in response to receiving a voicemail message, and so forth. First, the voicemail application checks if there is a voicemail selected for playback at step 602. If there is not, then it is finished processing, which need not be an actual end of the application, but rather can include prompting and/or wait for further instructions. However, if there is a voicemail selected for playback, then the process of FIG. 6 plays the selected voicemail at step 604. In one exemplary embodiment, the user presses the Play/Pause 210 button to initiate playback of the selected voicemail. In an alternative embodiment, the voicemail application may automatically play the selected voicemail without need of the user to press the Play/Pause 210 button once the voicemail is selected for playback.

During playback, a user may control the playback of an individual voicemail message or browse among the voicemail messages using the media transport controls. For example, a user may rewind a portion of the voicemail played or skip over an unplayed portion of the voicemail. A user may also completely rewind to the beginning of the played portion of the voicemail or fast forward to the end of the voicemail. A user may also pause playback of the voicemail and rewind or fast forward through portions of the voicemail while paused. A user may also stop playback of the voicemail. Additionally, a user may scroll forward and backward through the list of voicemail messages to view messages using the Previous 214 and Next 216 buttons of the media transport controls. A user may also select another voicemail message for playback by pressing the Play/Pause 210 button.

Once playback has stopped, the voicemail application checks if a reply is to be recorded at step 606. If there is not, then the application returns to step 602 to check if another voicemail message has been selected. However, if a reply is to be recorded, then it proceeds to record a reply at step 608. After the reply is recorded, the reply is sent at step 610. A user may send a reply by pressing the enter key on the keyboard, or may do so by other means such as selecting the send item from a graphical user interface menu and so forth. After sending the reply, the application returns to step 602 to check if another voicemail message has been selected. If there is no other voicemail selected, then the voicemail application is finished, although it understood that the application may not close until specifically commanded by the user, but may instead wait for further instruction. Note that the steps of FIG. 6 are only examples, and that there are other exemplary ways for a voicemail application to access and respond to voicemail using transport controls. For example, the voicemail application may be event driven, and thus step 602 may represent an event that triggers the selection of a voicemail message for playback.

Figure 7:
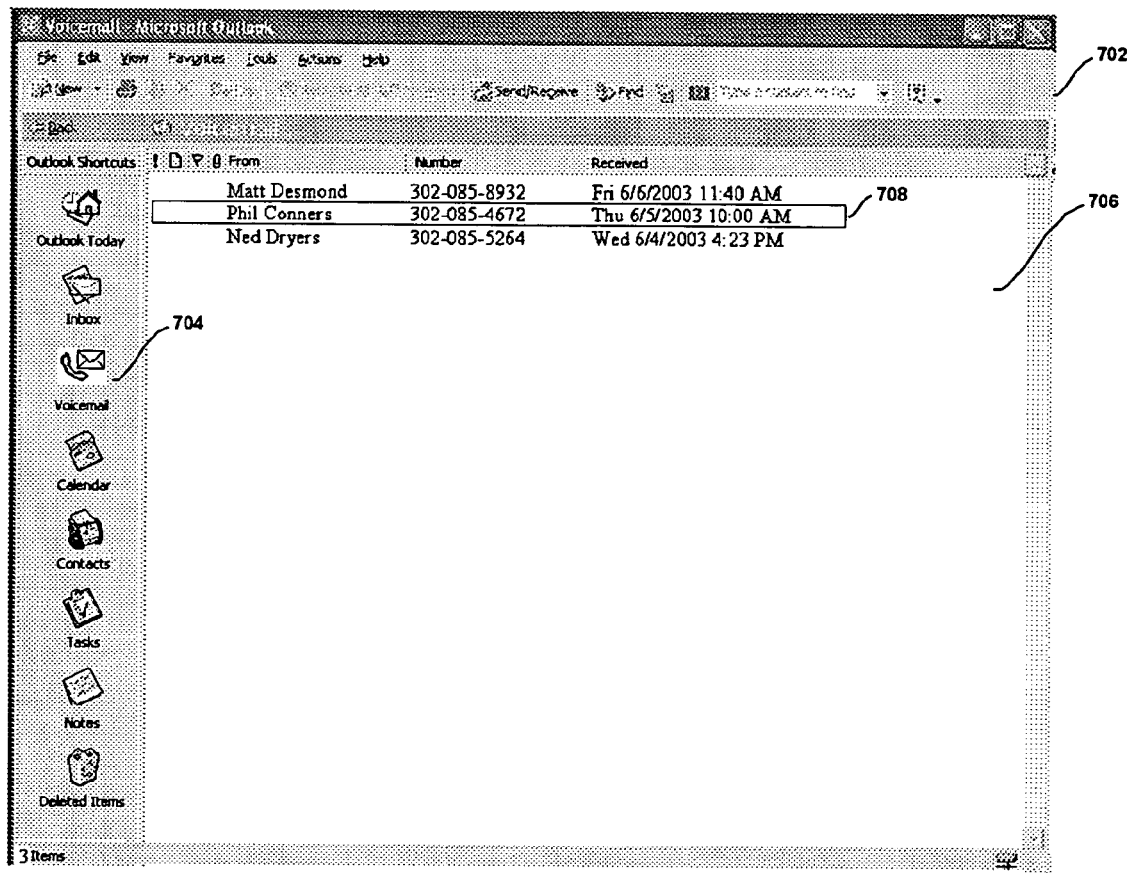
FIG. 7 is an exemplary illustration generally representing a graphical user interface of a voicemail application, in accordance with an aspect of the present invention.

The voicemail application may be a standalone application or integrated with a voicemail-capable application program such as Microsoft® Outlook, as illustrated in FIG. 7, which represents an exemplary graphical user interface. The graphical user interface 702 includes a shortcut to the voicemail application with an associated icon 704 in the Outlook shortcut bar. By selecting the voicemail application shortcut, the voicemail application is invoked and a list of voicemail messages are presented in display area 706. Various properties may be displayed for each voicemail. For example, in the exemplary graphical user interface illustrated, the person who sent the voicemail is shown under the "From" column, the contact phone number is shown under the "Number" column, and the time the voicemail message was received is shown under the "Received" column. Other properties captured for the voicemail may also be displayed such as the size of the voicemail message, whether the voicemail message was forwarded, possibly a priority, and so forth.

As previously described, a user may scroll forward and backward through the list of voicemail messages to view messages using the Previous 214 and Next 216 buttons of the media transport controls. For example, a user may move the selection box 708 from the first voicemail message to the second voicemail message by pressing the Next 216 button. As a result, the voicemail message is selected for playback as shown in FIG. 7. A user may then initiate playback of the selected voicemail message by pressing the Play/Pause 210 button. Alternatively, the user may press the Enter key on the keyboard, or select an item from a graphical user interface, and so forth.

Figure 8:
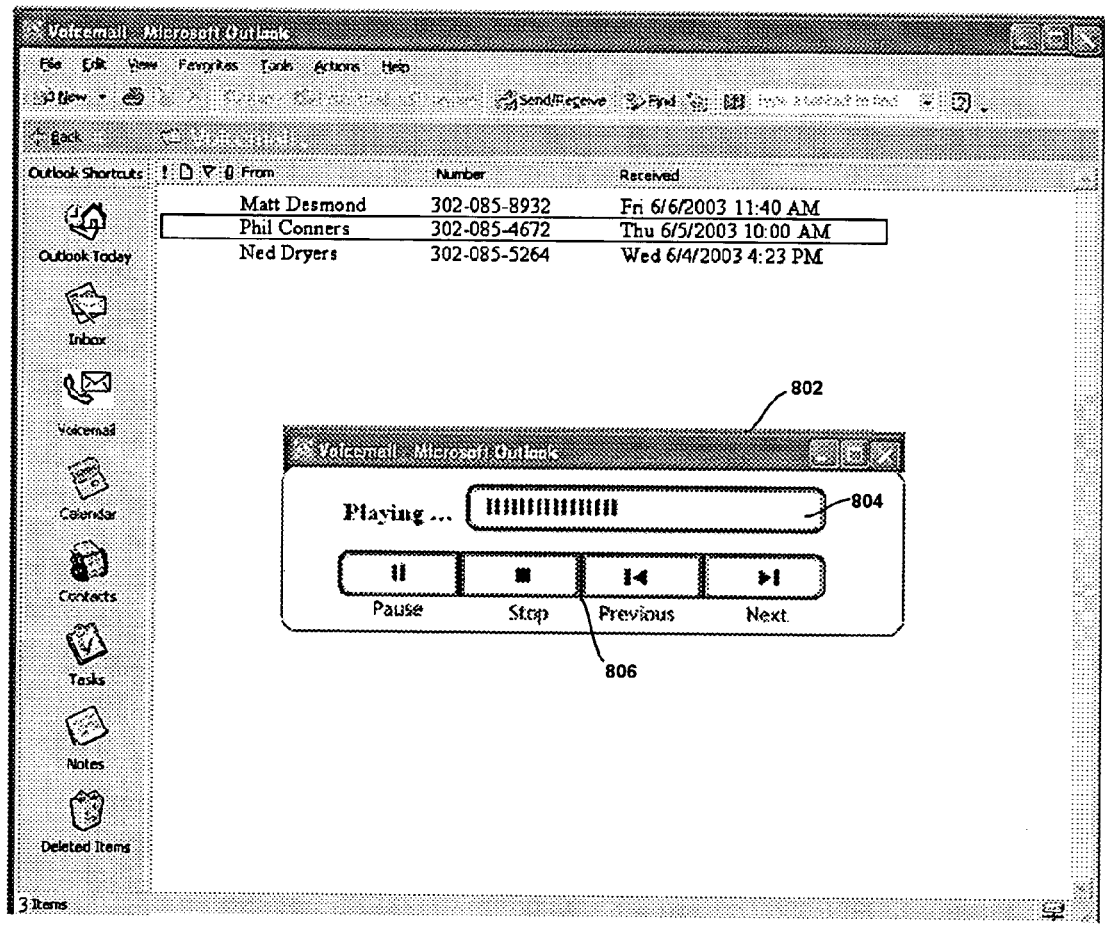
FIG. 8 is an exemplary illustration generally representing a graphical user interface of a voicemail application during playback of a selected voicemail message, in accordance with an aspect of the present invention.

FIG. 8 illustrates the playback of the selected message from a selected caller. When playback of a voicemail begins, a playback window 802 may appear onscreen. The playback window 802 may include a progress bar 804 and graphical user interface buttons 806 corresponding to the transport control 206 buttons for pause, previous, next and stop. The progress bar 804 indicates the percent of the recorded message played by filling an equivalent percent of the progress bar area with stripes. A user may control playback of a voicemail message using the transport control 206 media buttons or using the displayed graphical user interface buttons 806. When the voicemail message stops, the playback window 802 may disappear. After playback of the voicemail message completes, a user may record a reply to the voicemail message for sending to the person who sent the voicemail. Note that a record button or the like may be used for this purpose, and/or a graphical user interface.

Figure 9:
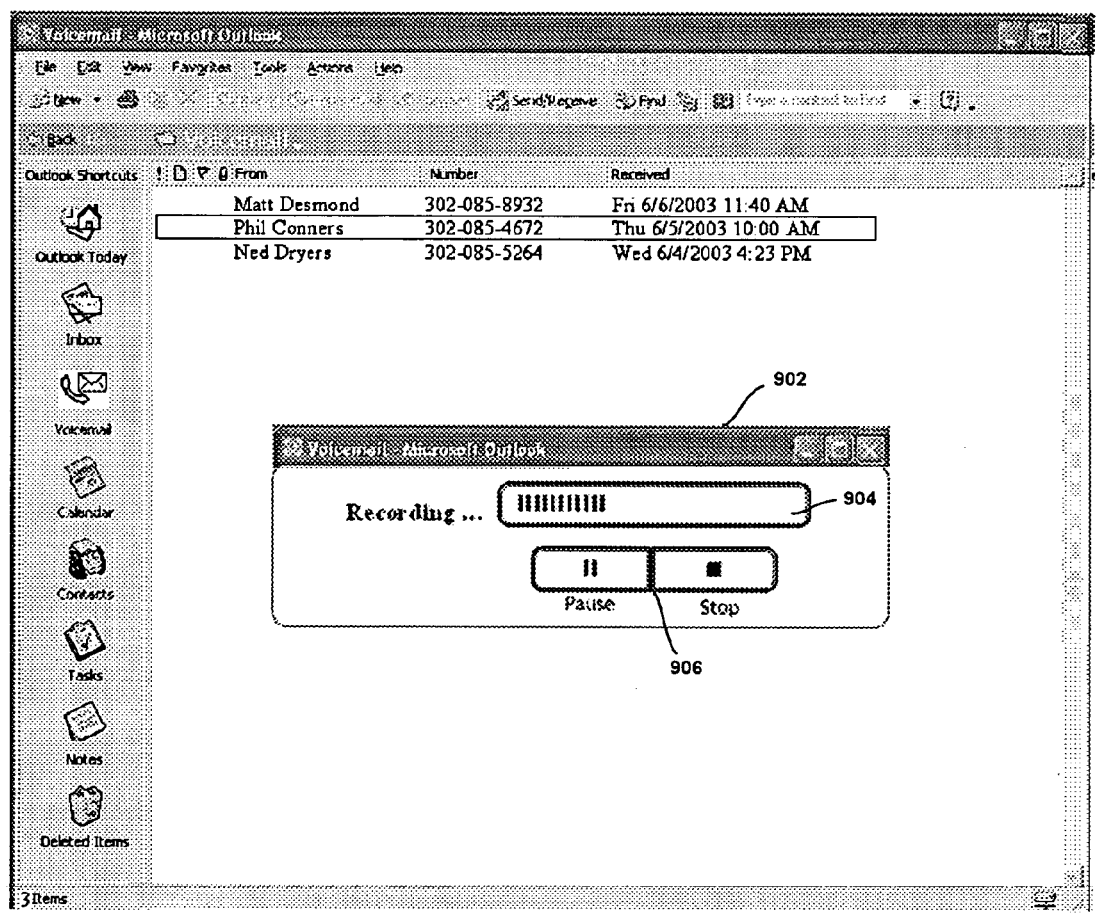
FIG. 9 is an exemplary illustration generally representing a graphical user interface of a voicemail application while recording a reply to a voicemail message, in accordance with an aspect of the present invention.

FIG. 9 illustrates recording a reply to a voicemail message. When recording begins, a recording window 902 may appear onscreen. The recording window 902 may include a progress bar 904 and graphical user interface buttons 906 corresponding to the transport control 206 buttons for pause and stop. The progress bar 904 indicates an amount being recorded (such as relative to some time, e.g., one minute, which may change to some other time if reached) by partially filling the progress bar area with stripes. A user may control recording of a reply to a voicemail message using the transport control 206 media buttons or using the displayed graphical user interface buttons 906. When recording of the reply to the voicemail message is finished, the recording window 902 may disappear. After recording of the voicemail message is completed, a user may send the recorded reply to the person who sent the voicemail message. A user may also play back the message before sending, the sending may be made automatic, and so on.

Although FIGS. 5–9 were described using a voicemail application as an example, those skilled in the art will appreciate that there are many applications that may use the transport controls for multimedia playback and to navigate to individual tracks or segments of a multimedia stream. For instance, the transport controls may be used for recording annotations for desktop applications such as Microsoft Word, Excel, and so forth. As an example in particular, a user may wish to record an annotation for a cell in a Microsoft® Excel spreadsheet. The user may select the cell, begin recording an annotation by pushing a record button, and then end recording the annotation by pushing the Stop 212 button. After the annotation is recorded, the user may use the transport controls 206 for reviewing the recorded annotation. By pressing the Previous 214 button, the user can rewind the recording. By pressing the Next 216 button, the user can fast forward through the recording. The user can also press the Play/Pause 210 button during playback to pause the playback and then begin recording by pushing a record button. After reviewing or editing the recorded annotation, the use may save the annotation to the selected cell by pressing the Enter key on the keyboard. Note that the annotation may be simply an audio recording, or a video recording, or any multimedia recording.

As can be seen from the foregoing detailed description, there is provided a system and method for navigating and accessing any media content of computer applications using media transport controls. These transport controls allow users to intuitively activate and interact with multimedia content in a variety of applications such as handling voice mail and annotations. The system and method is fairly comprehensive as well as flexible and extensible to handle many user scenarios and usage patterns. Additional transport controls may be easily added. The system and method thus provide significant advantages and benefits needed in contemporary computing and communications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A general purpose computer system for navigating and accessing content, comprising:
a plurality of applications, at least one of the applications handling a different type of media content than another application, and wherein at least one of the applications comprises a voice mail application;
transport controls independent of the applications for inputting commands to navigate and access content of the applications; and
an operating system having a component operably coupled to the transport controls and the applications, the component receiving the input commands from the transport controls and sending the input commands to the applications,
wherein the voice mail application receives the input commands corresponding to the transport controls for browsing a list of voice mail messages and wherein the input commands use at least one member of a set containing previous and next.

2. The system of claim 1 wherein the voice mail application receives an input command corresponding to the transport controls for reviewing a recorded reply to a voice mail message.

3. The system of claim 1 wherein one of the applications comprises a spreadsheet application.

4. The system of claim 3 wherein the spreadsheet application receives an input command corresponding to the transport controls for recording an annotation to a cell of a spreadsheet.

5. The system of claim 3 wherein the spreadsheet application receives input commands from the transport controls for reviewing a recorded annotation made to a cell of a spreadsheet.

6. The system of claim 5 wherein the input commands use at least one member of the set comprising previous and next.

7. The system of claim 1 wherein one of the applications comprises a word processing application.

8. The system of claim 7 wherein the word processing application receives the input commands corresponding to the transport controls for recording an annotation to a document.

9. The system of claim 7 wherein the word processing application receives input commands from the transport controls for reviewing a recorded annotation made to a document.

10. The system of claim 9 wherein the input commands use at least one member of a set containing previous and next.

11. The system of claim 1 wherein the transport controls use at lease one member of a set containing play, pause, stop, previous, next, and record.

12. The system of claim 1, wherein the buttons of the transport controls reside on a computer housing.

13. The system of claim 1, wherein the buttons of the transport controls reside on a computer keyboard.

14. The system of claim 1, wherein the buttons of the transport controls reside on a computer monitor.

15. The system of claim 1, wherein the buttons of the transport controls reside on a communications panel.

16. The system of claim 1, wherein the buttons of the transport controls reside on a remote control.

17. The system of claim 1, wherein the component operably coupled to the transport controls comprises a hardware interface.

18. The system of claim 1, wherein the operating system further comprises a component for controlling an indicator for a transport control.

19. The system of claim 18, wherein the indicator uses at least one member of a set containing visual, audible, and tactile representations.

20. The system of claim 19 wherein the indicator comprising a visual representation illuminates with the color red while recording.

21. The system of claim 19 wherein the indicator comprising a visual representation illuminates with the color amber while pausing.

22. A method in a computer system, comprising:
launching an application for navigating and accessing one type of media content;
browsing the content using transport controls;
playing a portion of the content using the transport controls;
launching a second application for a different type of media content, wherein the second application comprises a voice mail-capable application, that includes at least one of a spreadsheet application and a word processing application, having annotations that use at least one member of a set containing visual, audible, and tactile content;
browsing the different type of media content using the transport controls; and
playing a portion of the different type of media content using the transport controls.

23. The method of claim 22, wherein the second application for the different type of media content comprises a spreadsheet application having annotations that use at least one member of a set containing visual, audible, and tactile content.

24. The method of claim 22, wherein the second application for the different type of media content comprises a word processing application having annotations that use at least one member of a set containing visual, audible, and tactile content.

25. The method of claim 22, wherein browsing the content using the transport controls further comprises using at least one member of a set containing a previous button and a next button.

26. The method of claim 22, wherein playing a portion of the content using the transport controls further comprises using a play button.

27. A computer-readable storage medium having computer-executable instructions stored, therein, for performing the method of claim 22.

28. A method for accessing voice mail in a computer system, comprising:

Selecting a voice mail message from a list of voice mail messages using transport controls that are independent of a voice mail application program such that the transport controls are operable to interface with at least one other media application other than a voice mail application;
playing the voice mail message that was selected;
recording a reply to the voice mail played; and
sending the reply to the sender of the voice mail.

29. The method of claim 28, wherein selecting the voice mail message from the list further comprises using a previous button to step up the list of voice mail messages.

30. The method of claim 28, wherein selecting the voice mail message from the list of voice mail messages further comprises using a next button to step down the list of voice mail messages.

31. A computer-readable storage medium having computer-executable instructions stored, thereon, for implementing a method comprising;
inputting commands through transport controls to navigate and access a plurality of different types of audible content including voice mail messages and wherein at least some of the audible content comprises annotations made to a document; and
operably coupling a component of an operating system to the transport controls for receiving the input commands from the transport controls.

32. The computer-readable medium of claim 31, wherein the audible content comprises annotations made to a spreadsheet.

33. A general purpose computer system for navigating and accessing content, comprising:
a plurality of applications, at least one of the applications handling a different type of media content than another application, and wherein at least one of the applications comprises a voice mail application;
transport controls independent of the applications for inputting commands to navigate and access content of the applications; and
an operating system having a component operably coupled to the transport controls and the applications, the component receiving the input commands from the transport controls and sending the input commands to the applications,
wherein the voice mail application receives an input command corresponding to the transport controls for reviewing a recorded reply to a voice mail message.

34. The system of claim 33 wherein the voice mail application receives the input commands corresponding to the transport controls for browsing a list of voice mail messages.

35. The system of claim 34 wherein the input commands use at least one member of a set containing previous and next.

* * * * *